UNITED STATES PATENT OFFICE.

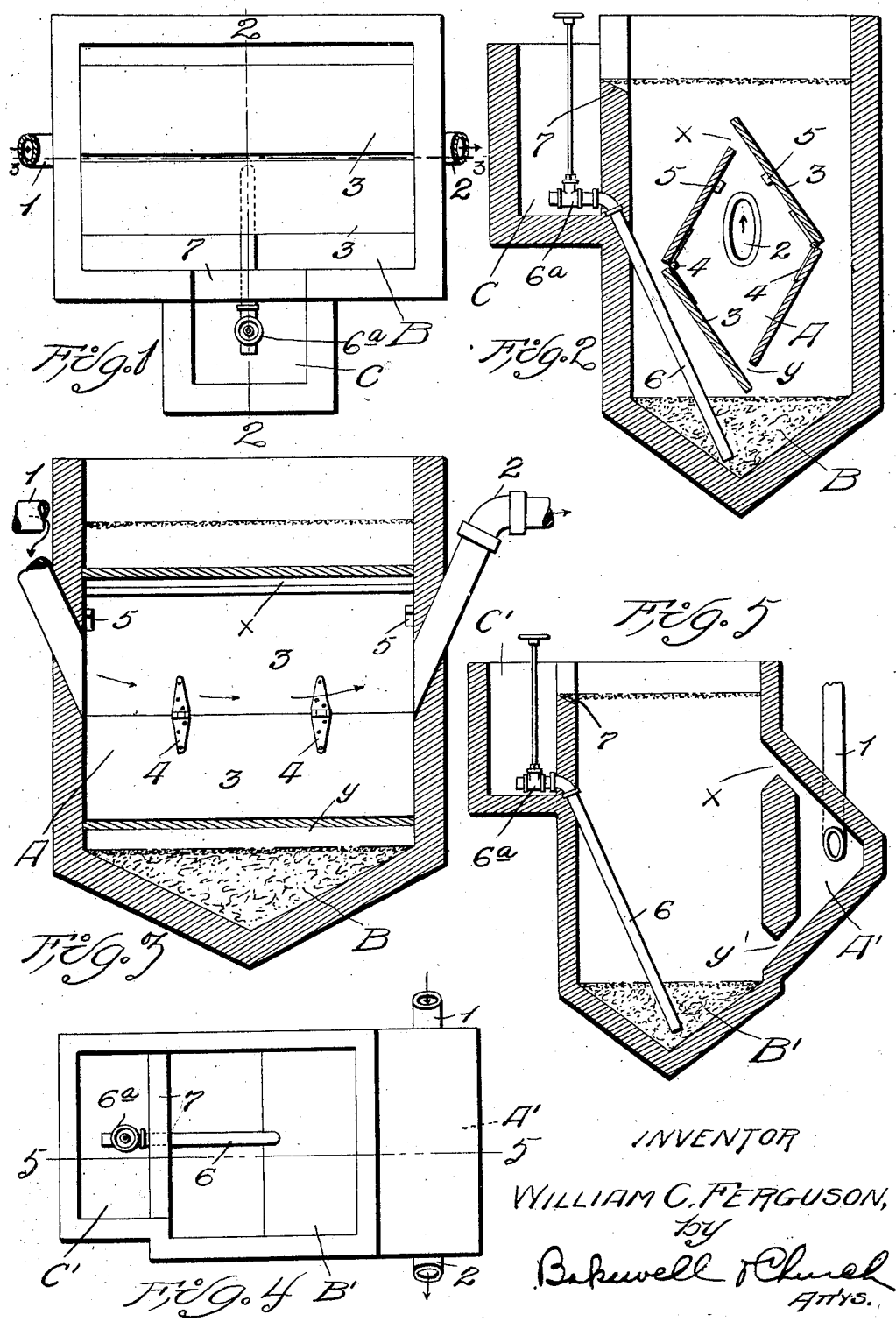

WILLIAM C. FERGUSON, OF ST. LOUIS, MISSOURI.

APPARATUS FOR PURIFYING AND DISPOSING OF SEWAGE.

1,380,200.     Specification of Letters Patent.     Patented May 31, 1921.

Application filed July 22, 1919. Serial No. 312,620.

*To all whom it may concern:*

Be it known that I, WILLIAM C. FERGUSON, a citizen of the United States, residing at St. Louis, Missouri, have invented a certain new and useful Improvement in Apparatus for Purifying and Disposing of Sewage, of which the following is a full, clear, and exact description, such as will enable others skilled in the art to which it appertains to make and use the same.

This invention relates to sewage disposal apparatus of the type in which the separation of the solid particles of the sewage from the liquid is effected by sedimentation.

In sewage disposal apparatus of the general type above referred to now in use the raw sewage is introduced into a settling chamber wherein the liquid is maintained in a quiescent state so as to cause the heavy solid particles of the sewage to settle out of the liquid by gravity and enter a digesting chamber or sludge chamber wherein the process of digestion and fermentation takes place. While sewage disposal apparatus of the general type referred to that are now in use are efficient in that they effect the separation of the settleable solids, they have no means for effecting the separation and removal from the settling chamber of the floating sludge that constitutes a large percentage of the solid matter in the sewage and which is composed of the light solid particles of the sewage that rise to the surface of the liquid in the settling chamber and form a scum thereon. Moreover, sewage disposal apparatus of the general type referred to frequently produce an effluent that is stale and has a very offensive odor, due to the fact that the liquid of the raw sewage that is introduced into the settling chamber becomes polluted by coming in direct contact either with the stale liquid in the settling chamber on which the scum floats or particles of sewage in the scum that are undergoing fermentation.

One object of my invention is to provide an apparatus for purifying and disposing of sewage that will effect the separation of the solid particles of the sewage from the liquid without producing a stale effluent that has an offensive odor.

Another object is to provide an apparatus for purifying and disposing of sewage that will effect the separation and removal from the settling chamber of not only the settleable solids in the sewage, but also the floating sludge formed by the lighter solid particles of the sewage that are carried upwardly to the surface of the liquid by the bubbles of air and gas in the sewage.

To this end I have devised an apparatus, which, briefly described, consists of a chamber, compartment or passageway through which sewage flows and which is arranged in a lower horizontal plane than the conduit through which the sewage is supplied to the apparatus, so as to cause the lighter solid particles of the sewage in said chamber that are carried upwardly by the inherent bubbles of air and the gas generated by the decomposition of the sewage to escape from said chamber, and a second chamber, compartment or space for receiving the floating sludge formed by the lighter solid particles of the sewage that are floated off or separated from the liquid by flotation.

Figure 1 of the drawings is a top plan view of one form of apparatus constructed in accordance with my invention.

Fig. 2 is a vertical transverse sectional view of said apparatus taken on the line 2—2 of Fig. 1.

Fig. 3 is a longitudinal sectional view of the apparatus shown in Figs. 1 and 2, taken on line 3—3 of Fig. 1.

Fig. 4 is a top plan view of another form of apparatus embodying my invention; and Fig. 5 is a vertical transverse sectional view of the apparatus shown in Fig. 4, taken on approximately the line 5—5 of Fig. 4.

Referring to Figs. 1 to 3 of the drawings which illustrate one form of apparatus constructed in accordance with my invention, A designates a chamber through which sewage flows, and B designates a second chamber which I will refer to as a sludge chamber that is adapted to receive the solid particles of the sewage which are separated from the liquid in the chamber A by sedimentation and by flotation. The chamber A is so arranged with relation to the inlet pipe 1 through which the raw sewage is introduced into said chamber and the outlet pipe 2 through which the effluent is discharged from said chamber that the chamber A will always be completely filled with sewage, and the chamber B is so arranged with relation to the chamber A that said chamber B is capable of holding a body of liquid whose level is higher than the top or upper end of the chamber A, this being accomplished by arranging the chamber A inside of the chamber B and at a point below the inlet and outlet pipes. The lighter solid particles of the sewage in the chamber A will be carried upwardly by the bubbles of air and the gas generated by the decomposition of the sewage and will escape from said chamber A into the chamber B through a discharge opening $x$ in the upper end of the chamber A, as shown in Fig. 2. The heavier solid particles of the sewage in the chamber A that settle out of the liquid by gravity will escape from said chamber A into the chamber B through a discharge opening $y$ at the lower end of the chamber A. It will thus be seen that the chamber A virtually forms a combined flotation and sedimentation chamber and that the chamber B virtually forms a sludge chamber for the settleable solids and for the floating sludge. In view of the fact that the lighter solid particles of the sewage which are separated from the liquid in the chamber A by flotation, are conducted out of said chamber A and confined in the chamber B, there is no liability of the effluent that escapes from the chamber A becoming polluted by coming in contact with a mass of stale liquid on which scum floats or particles of solid sewage that are undergoing fermentation. Accordingly the effluent that is discharged from the chamber A through the effluent discharge pipe 2 will be fresh and practically in a clarified state. Moreover, as provision is made for separating and collecting not only the settleable solids, but also the floating sludge, the apparatus is more efficient than apparatus of this kind now in use which have no means for separating and recovering the lighter, floating solids which form a large percentage of raw sewage.

The chamber A can be formed conveniently by arranging diaphragm wall or partition plates 3 longitudinally of the chamber B at a point below the upper edge of the chamber B and below the horizontal portion of the inlet pipe 1 through which the raw sewage flows into the apparatus and the horizontal portion of the effluent pipe 2 through which the effluent is discharged from the apparatus. In the form of my invention shown in Figs. 1 to 3 the chamber A is formed by four diaphragm walls or partition plates 3 arranged so that they form a chamber A of substantially diamond shape in cross section, but I wish it to be understood that the particular shape of the chamber is immaterial, so far as my broad idea is concerned, although it is preferable to make the top wall or portion of the chamber A of such form that it tends to direct the floating lighter solid particles of the sewage toward the discharge outlet $x$ in said chamber through which the floating particles pass into the sludge chamber B. If desired, the two plates or members 3 that form the top wall or upper half of the chamber A can be mounted on hinges 4 and sustained by stops 5 on the end walls of the chamber B so as to enable the chamber A to be opened up to facilitate the inspection of same. The sediment or sludge composed of the settleable solids that collects in the bottom of the chamber B can be withdrawn from same through a suction pipe 6 provided with a controlling valve $6^a$ and having its lower end terminating adjacent the bottom of the chamber B, and the scum or floating sludge that collects on the surface of the liquid in the chamber B can be removed from same at intervals by scraping same into a sludge discharge chamber C over a skimming weir 7 arranged at the upper edge of the chamber B in proximity to the sludge discharge chamber C, as shown in Fig. 2.

In the apparatus shown in Figs. 1 to 3, the combined sedimentation and flotation chamber is arranged in the sludge chamber in such a manner that it is surrounded by or submerged in the liquid in the sludge chamber. This is not essential, however, for if desired, the apparatus can be provided with a combined flotation and sedimentation chamber A' arranged at one side of a sludge chamber B' and having its upper and lower ends connected with said sludge chamber by discharge passageways $x'$ and $y'$, as shown in Figs. 4 and 5.

Having thus described my invention, what I claim as new and desire to secure by Letters Patent, is:

1. An apparatus for purifying and disposing of sewage, comprising a combined sedimentation and flotation chamber, a raw sewage inlet pipe, an effluent discharge pipe, said chamber communicating with said pipes and being arranged in a lower horizontal plane than said pipes, a sludge chamber adapted to hold a body of liquid whose level is above the upper end of said flotation and sedimentation chamber, and passageways leading from the upper and lower ends of said sedimentation and flotation chamber to said sludge chamber.

2. An apparatus for purifying and disposing of sewage, comprising a flotation and sedimentation chamber arranged in a lower horizontal plane than the conduit through which the sewage is supplied laterally to the apparatus, a sewage discharge conduit leading laterally from said chamber, a sludge chamber, passageways that connect said sludge chamber with the upper and lower ends of said sedimentation and flotation chamber, a sludge discharge chamber, and means for permitting the sediment in the bottom of said sludge chamber and the scum that floats on the top of the liquid in said sludge chamber to be removed and introduced into said sludge discharge chamber.

WILLIAM C. FERGUSON.